United States Patent [19]
Peilloud et al.

[11] Patent Number: 5,955,878
[45] Date of Patent: Sep. 21, 1999

[54] CIRCUIT FOR MULTIPLYING RESOLUTION AND FOR DETERMINING THE DIRECTION OF DISPLACEMENT

[75] Inventors: Fernand Peilloud, Hery sur Alby; Alain Bochet, Seynod, both of France

[73] Assignee: The Torrington Company, Torrington, Conn.

[21] Appl. No.: 08/939,259

[22] Filed: Sep. 29, 1997

[30] Foreign Application Priority Data

Sep. 30, 1996 [FR] France .................................. 96 11893

[51] Int. Cl.⁶ ............................. G01P 13/04; G01B 7/30; G01B 7/02; H02P 7/00

[52] U.S. Cl. ................. 324/165; 324/207.2; 324/207.25; 318/489; 318/466; 307/122

[58] Field of Search .................................. 324/160, 163, 324/165, 166, 173, 174, 207.2, 207.21, 207.25; 307/122; 340/672; 318/461, 466, 467, 470, 489; 702/145

[56] References Cited

U.S. PATENT DOCUMENTS

| | | | |
|---|---|---|---|
| 5,345,171 | 9/1994 | Simmons et al. | 324/165 |
| 5,500,585 | 3/1996 | Aab | 324/207.2 |

*Primary Examiner*—Jay Patidar
*Attorney, Agent, or Firm*—John C. Bigler

[57] ABSTRACT

A multipole magnetic encoder is movable past two fixed analog sensors delivering sinusoidal signals ($S_1$, $S_2$) phase-shifted by $\pi/2$. A generator produces 2n sinusoidal signals ($S_i$) of the same amplitude (A) as the signals ($S_1$, $S_2$), phase-shifted by $\pi/n$. An analog multiplexer delivers a signal (S) consisting of 2n successive portions of signals ($S_i$). An acquisition device determines a maximum envelope (E) of the signals ($S_i$). Two of switching thresholds ($L_i$) and ($L_j$) are generated proportional to the envelope (E). Two comparators compare the signal (S) with the thresholds ($L_i$) and ($L_j$), and deliver binary signals ($A_i$) and ($B_j$). Two combining devices combine the binary signals ($A_i$) and ($B_j$), each delivering a high resolution signal of 2m*n periods in the interval of one period of one of the sensors.

14 Claims, 4 Drawing Sheets

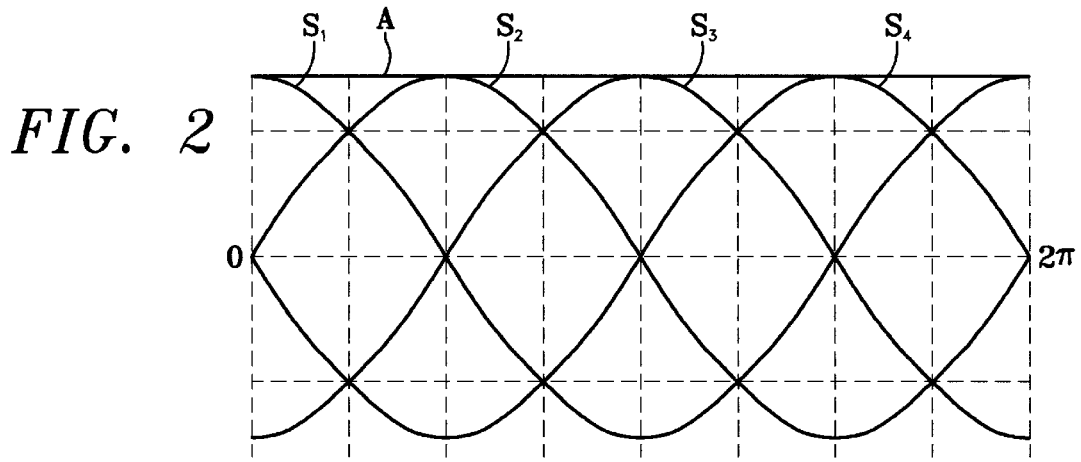
FIG. 2
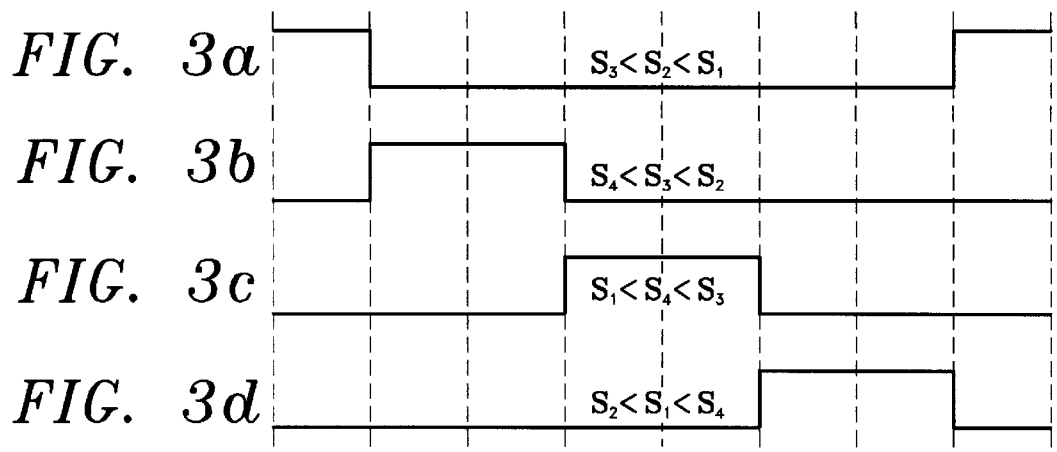
FIG. 3a
FIG. 3b
FIG. 3c
FIG. 3d
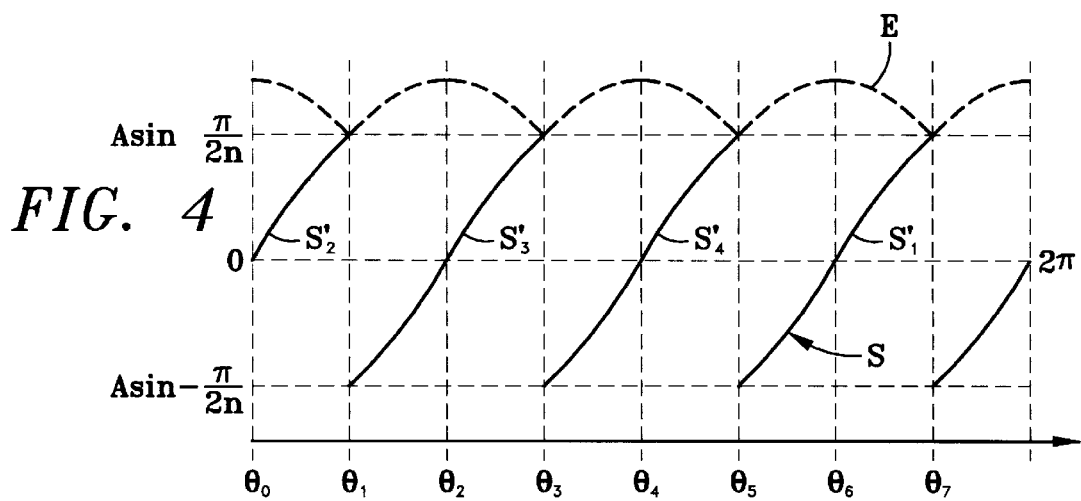
FIG. 4

CIRCUIT FOR MULTIPLYING RESOLUTION AND FOR DETERMINING THE DIRECTION OF DISPLACEMENT

This invention relates to a circuit for multiplying the resolution of electrical signals and, more particularly, of those emitted by speed and displacement sensors.

Speed or displacement sensor systems are generally produced with a multipole magnetic encoder which can move and a relatively stationary digital-output Hall-effect or magnetoresistive-effect sensor, and have low resolution.

At the present time, a first known method of increasing the resolution of speed or displacement sensor systems consists in reducing the length of the polar period of the encoder. However, the increase in the number of periods thus obtained is limited by the weakening of the magnetic field available as seen by the sensor, which weakening has to be compensated for by reducing the air gap between the sensor and the encoder. For reasons of availability of space, this compensation is not always possible, or alternatively forces an increase in the required accuracy of the assembly of components bringing the sensor and the encoder together, which is something that leads to an increase in production costs.

A second known method consists in adding additional digital sensors in the interval of one magnetic period of the encoder, these sensors providing a high number of digital output indications. This method is limited by the space available and also leads to an increase in the production cost. What is more, when the temperature rises, the differential drifting of the switching points of the digital sensors leads to output signals which are not very precise, or are even inaccurate, and this leads to a reduction in reliability.

European Patent Application EP 0 684 455 A1 describes a resolution multiplier using two analog sensors positioned 90 degrees apart, electrically speaking, these sensors being fitted with means for holding maxima and minima and with means for generating thresholds from the maximum and minimum values. This method is operational only when the signals seen by the sensors have at least reached these extreme values, so that at the time the multiplier device comes into operation, no output signal is valid. Another drawback of this method arises during displacements at very low speed, during which the means of holding the maxima and minima, which consist of devices using time constants, do not fulfill their functions satisfactorily.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for multiplying the resolution and for determining the direction of displacement of a sensor system consisting of a multipole magnetic encoder which can move past at least two fixed analog sensors, delivering sinusoidal signals of equal maximum amplitudes, these being centered on one and the same reference value and phase-shifted by $\pi/2$ radians, electrically speaking. Generator means generates 2n sinusoidal signals ($S_i$) of the same amplitude (A), of the same center value as the signals delivered by the analog sensors, phase-shifted by $\pi/n$ with respect to each other, n being a positive whole number greater than or equal to 2. Multiplexing means provides analog multiplexing of the 2n signals ($S_i$), delivering a signal (S) consisting of the succession of 2n portions of signals ($S_i$) phase-shifted by $\pi/n$, the amplitude of which lies between two values: $A*\sin(-\pi/2n)$ and $A*\sin(\pi/2n)$. Acquisition means defines a maximum envelope (E) of the 2n signals ($S_i$). First and second threshold means generate (2m-1) switching thresholds ($L_i$) and ($-L_i$) and 2m switching thresholds ($L_j$) and ($-L_j$), respectively, which are proportional to the envelope (E), m being a positive whole number chosen as a function of the desired final resolution. First and second comparator means compare the signal (S) respectively with each of the thresholds ($L_i$), ($-L_i$) and ($L_j$), ($-L_j$) originating from the first and second generator means delivering binary signals ($A_i$) and ($B_j$). First and second combining means combine the binary signals ($A_i$) and ($B_j$) delivering a signal ($V_1$) and ($V_2$), respectively, these signals being phase-shifted angularly by $\pi/4m*n$, each consisting of $2m*n$ periods of angle $\pi/m*n$ in the interval of one period $(0,2\pi)$ of one or other of the signals originating from the analog sensors.

The foregoing and other aspects will become apparent from the following detailed description of the invention when considered in conjunction with the accompanying drawing figures.

BRIEF DESCRIPTION OF THE DRAWING FIGURES

FIG. 1 is a functional electronic diagram of a device illustrating an embodiment according to the invention;

FIGS. 2 through 6, and 8 through 12 are graphic representations of signals originating from the functional units of the device of FIG. 1; and FIGS. 7 and 13 are graphic representations of the high-resolution signals output from the device according to the invention.

DETAILED DESCRIPTION

Figure 1:
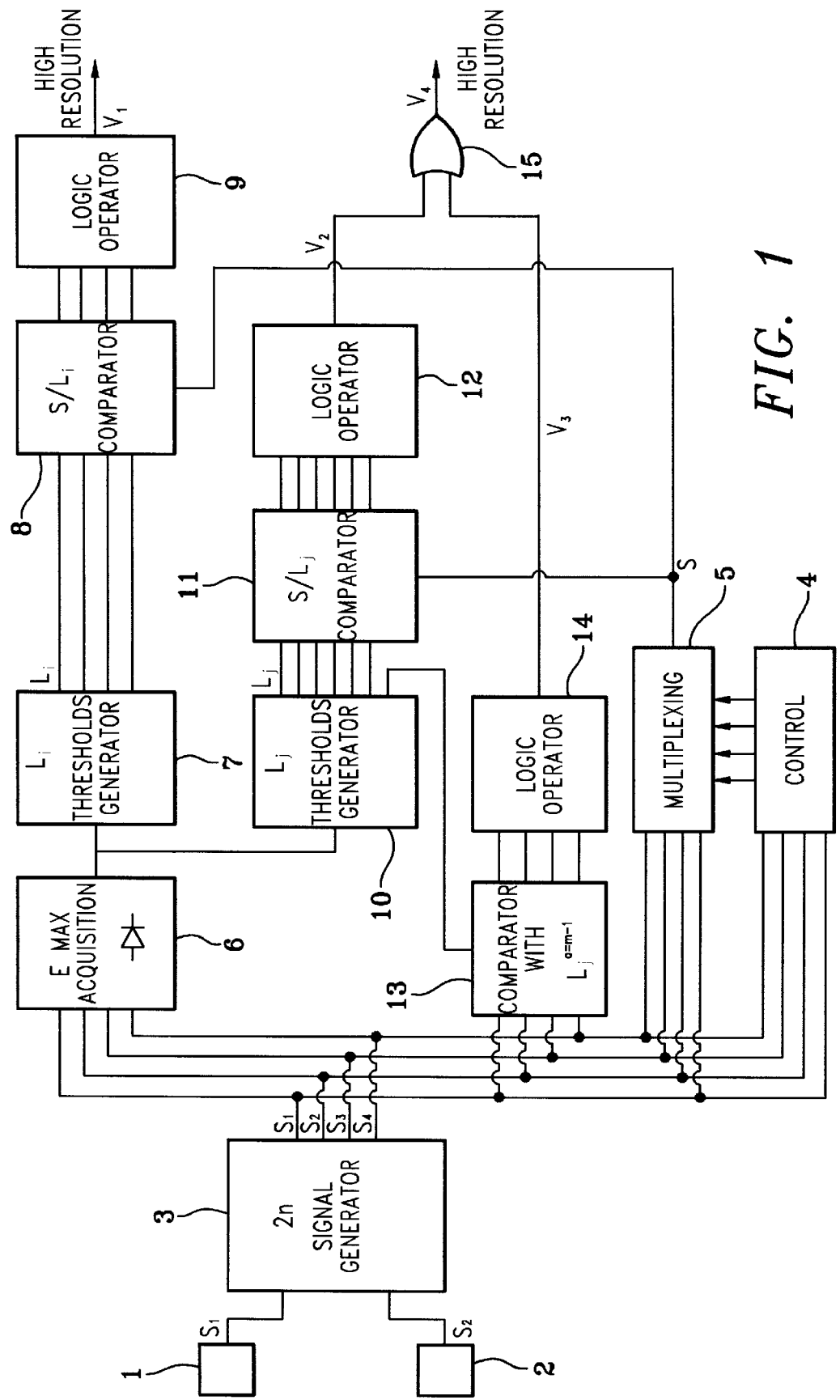

The invention provides a device for multiplying the resolution of a multipole magnetic encoder of the Hall-effect or magnetoresistive-effect type, for example, using at least two fixed analog sensors phase-shifted electrically by $\pi/2$ radians in relation to the polarities of the encoder, of which the sinusoidal signals, of the same amplitude, are centered on the same origin offset value taken as a reference zero. As shown in FIG. 1, which is a functional electronic diagram illustrating a device according to the invention, analog sensors 1 and 2 send sinusoidal signals $S_1$ and $S_2$ respectively, having the same amplitude A, the same period P and which are phase-shifted electrically by $\pi/2$ radians, to the input of means 3 for generating a number equal to 2n sinusoidal signals, n being a positive whole number equal to or greater than 2, in an electrical interval equal to $2\pi$ radians.

FIGS. 2 through 7 are graphic representations of the signals delivered by the functional units of the device according to FIG. 1, as a function of the angular position $\theta$ of the encoder with respect to the sensors in the particular nonlimiting example of n being equal to 2. FIG. 2 represents the 2n sinusoidal signals, referenced $S_i$ with i lying between 1 and 4, which have the same amplitude A and the same period $P=2\pi$ as the signals $S_1$ and $S_2$ originating from the two sensors, centered on the same value serving as a reference zero and electrically phase-shifted in pairs by $\pi/n$ radians, i.e. $\pi/2$ radians, consecutively. The sign of the displacement of the magnetic encoder is fixed permanently by identifying the succession of sinusoidal signals appearing for one direction of displacement from 0 to $2\pi$ radians chosen conventionally with respect to the geometric situations of the two analog sensors 1 and 2.

The 2n sinusoidal signals $S_i$, i being a whole number lying between 1 and 2n, originating from generation means 3, are sent to means 4 for comparing the instantaneous value of each of the signals with each of the (2n−1) other instantaneous values of these signals. Comparison means 4 is connected to means 5 for the analog multiplexing of the 2n lines assigned to each of the 2n sinusoidal signals originating from generation means 3. Comparison means 4 serves as switching-control means for the multiplexing means 5, and these successively switch from one identified signal to the next identified signal, phase-shifted by π/n, as soon as their respective absolute values are equal. Thus the resulting signal S consists of the succession of 2n portions of signals phase-shifted by π/n in the electrical interval (0,2n), the amplitude of which lies between two values which are:

$$A*\sin(-\pi/2n) \text{ and } A*\sin(\pi/2n).$$

FIGS. 3a through 3d illustrate the signals originating from the comparison means 4 in the particular example of 4 signals $S_1$ to $S_4$ compared successively with one another. Thus, the signal of FIG. 3a corresponds to the detection of the value of the signal $S_2$ higher than the value of the signal $S_3$ and lower than the value of the signal $S_1$, between the angles $\theta_0=0$ and $\theta_1=\pi/4$, on the one hand, and $\theta_7=7\pi/4$ and $\theta_8=2\pi$ on the other hand, of the angular interval (0,2π), in such a way that only that line of the multiplexing means which is dedicated to the signal $S_2$ is activated. FIG. 3b corresponds to the electrical interval between $\theta_1=\pi/4$ and $\theta_3=3\pi/4$, during which interval $S_3$ is higher than $S_4$ and lower than $S_2$, so that only the line dedicated to the signal $S_3$ is activated. FIG. 3c corresponds to the electrical interval between $\theta_3=3\pi/4$ and $\theta_5=5\pi/4$, during which interval $S_4$ is higher than $S_1$ and lower than $S_3$, thus activating the line dedicated to the signal $S_4$, and finally FIG. 3d corresponds to the electrical interval between $\theta_5=5\pi/4$ and $\theta_7=7\pi/4$, during which interval $S_1$ is higher than $S_2$ and lower than $S_4$ so as to activate the line dedicated to the signal $S_1$. It will be observed that this control comes into play for just one interval representing an electric angle of π/n, i.e. π/2 in this example, during the period (0,2π).

The 2n outputs of the multiplexing means 5 are connected in parallel, which is why the signal S at output consists of a succession of 2n signals $S_i'$, each one corresponding to one of the signals $S_i$. In the special case of n=2, the signal S consists, in the angular interval (0,2π) of the four portions $S'_1$, to $S'_4$ each belonging to one of the four signals $S_1$ to $S_4$, the amplitude of which lies between $A*\sin(-\pi/4)$ and $A*\sin(\pi/4)$, linked up in degrees by switching transients featured as vertical lines as shown by FIG. 4. At the same time, means 3 for generating the 2n signals $S_i$ phase-shifted by π/n is connected to means 6 for the acquisition of the instantaneous value of the maximum envelope E of these 2n signals which consists of the highest instantaneous value of the signals.

Figure 5:
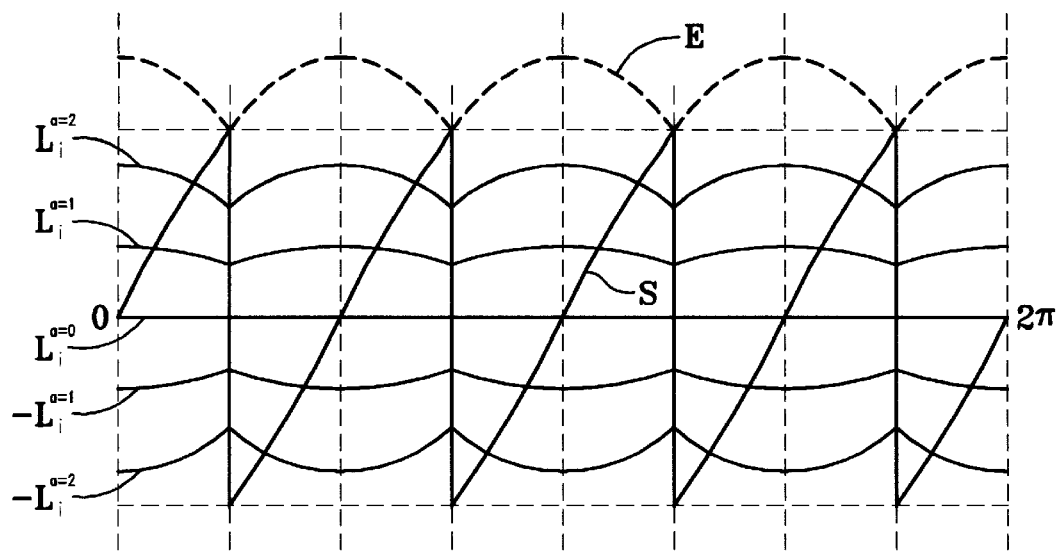

Means 7 for generating thresholds uses this envelope E to produce a first series $L_i$ of switching thresholds which are proportional to the envelope E and defined by the formula (1):

$$L_i = E* \tan [\pi/2n*2a/2m] \quad (1)$$

with m: positive whole number chosen as a function of the desired final resolution,
and a: positive whole number adopting all values from 0 to (m−1). Means 7 also produces a second series $-L_i$ of switching thresholds symmetric with the thresholds $L_i$ with respect to the reference zero, which is the value on which the original sinusoidal signals are centered. FIG. 5 is a graphic representation of the signal S originating from the multiplexing means, according to the nonlimiting embodiment of n being equal to 2 and m being equal to 3, and of the 2m−1=5 thresholds $L_i$ and $-L_i$ which are equal to:

$$L_i^{a=2} = E*\tan\pi/6$$

$$L_i^{a=1} = E*\tan\pi/12$$

$$L_i^{a=0} = 0$$

$$-L_i^{a=1} = -E*\tan\pi/12$$

$$-L_i^{a=2} = -E*\tan\pi/6$$

The signal S lies between a series of fields bounded by the switching thresholds:

$$[S<-L_i^{a=m-1}];\ [L_i^{a=m-1}<S<-L_i^{a=m-2}];\ \ldots;$$
$$[L_i^{a=m-2}<S<L_i^{a=m-1}];\ [L_i^{a=m-1}<S]$$

and to each of which is permanently assigned a binary value, different from its immediate neighbors, equal to 0 when the instantaneous value of the signal S is lower than the value of the thresholds and equal to 1 when this value is higher than these same threshold values.

In order to achieve this, comparison means 8 connected at the output of the threshold generating means 7 compares the instantaneous value of the signal S belonging to the succession of the 2n portions of signals phase-shifted by π/n in the electrical interval (0,2πn) with the value of the switching thresholds $-L_i$ and $L_i$ taken in increasing order of value and delivers 2m−1 square wave signals Ai, i being a whole number ranging in value from 1 to 2m−1, i.e. from A1 resulting from the comparison of the signal S with the threshold $-L_i^{a=m-1}$ to $A_{2m-1}$ resulting from the comparison of the signal S with the threshold $L_i^{a=m-1}$, which respectively adopts the value 0 when the value of the signal S is lower than the value of the threshold under consideration and the value 1 when the instantaneous value of the signal S is higher than this same threshold value. The 2m−1 signals delivered by the comparison means 8 are then combined by a logic operator 9 carrying out the following Boolean operation:

$(A_1 \text{ AND NOT } A_2)$ OR $(A_3 \text{ AND NOT } A_4)$ ... OR $(A_{2m-3}$ AND NOT $A_{2m-2})$ OR $A_{2m-1}$ which, on a first output line of the resolution multiplication device, produces a high-resolution output signal $V_1$ composed of a number 2m*n periods of a square wave signal in the interval of one period P equal to (0,2π) of the signal sent by one of the analog sensors 1 or 2 and comprises alternately high states and low states, each having an angular value equal to π/2m*n.

Figure 6:
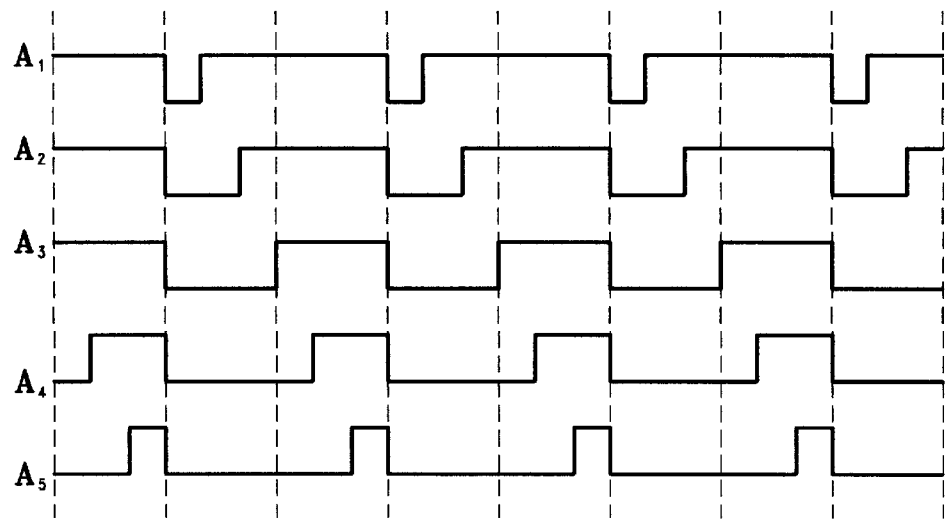
Figure 7:
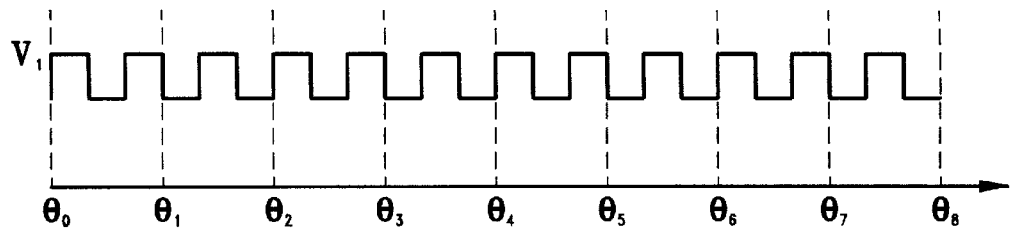

In the particular example of n being equal to 2 and m being equal to 3, comparison means 8 delivers 2m−1 square wave signals $A_i$ with i being a whole number ranging from 1 to 5, these being represented graphically in FIG. 6, and which adopt the value 0 when the instantaneous value of the signal S is lower respectively than the value of the thresholds $-L_i^{a=2}$, $-L_i^{a=1}$, 0, $L_i^{a=1}$, $L_i^{a=2}$, and the value 1 when this instantaneous value is higher respectively than these same threshold values. This means of generating thresholds may be achieved using voltage dividers. Also, the Boolean operation:

$(A_1 \text{ AND NOT } A_2)$ OR $(A_3 \text{ AND NOT } A_4)$ OR $A_5$ produces the high-resolution output signal $V_1$ represented in FIG. 7.

At the same time that the first switching thresholds $L_i$ and $-L_i$ are generated by the means 7, generation means 10 uses the maximum envelope E for the signals $S_i$ to deliver two other series of thresholds $L_j$ and $-L_j$ situated angularly each midway between two consecutive thresholds $L_i$ so as to obtain, on a second output line, a high-resolution signal which is in quadrature with the signal $V_1$ of the first line. The value of these thresholds is expressed by the following formula (2);

$$L_j = E^* \tan[\pi/2n^*(2a+1)/2m] \qquad (2)$$

a and m having the same definition as for the thresholds $L_i$. With the parameter a adopting all values from 0 to (m−1), there is a number equal to 2m thresholds which are, in the case of n=2 and m=3:

$$L_j^{a=2} = E^* \tan 5\pi/24$$

$$L_j^{a=1} = E^* \tan \pi/8$$

$$L_j^{a=0} = E^* \tan \pi/24$$

$$-L_j^{a=1} = -E^* \tan \pi/24$$

$$-L_j^{a=2} = -E^* \tan \pi/8$$

$$-L_j^{a=2} = -E^* \tan 5\pi/24$$

Figure 8:
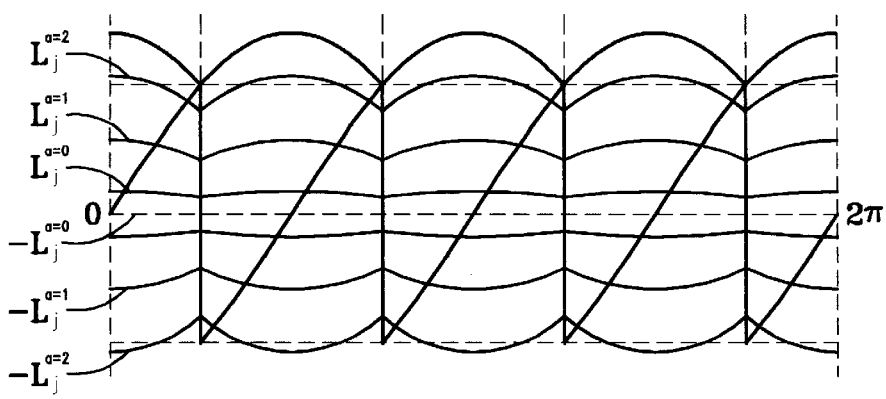

The signal S, as well as the maximum envelope E for the signals $S_i$ with the various thresholds $L_j$, are represented in FIG. 8. The thresholds $-L_j$ are symmetric with the thresholds $L_j$ with respect to the reference zero for the original sinusoidal signals $S_1$ and $S_2$. As before, the switching thresholds $L_j$ enclose successive fields of the signal S:

$$[S < -L_j^{a=m-1}]; \; [-L_j^{a=m-1} < S < -L_j^{a=m-2}]; \ldots;$$

$$[L_j^{a=m-2} < S < L_j^{a=m-1}]; \; [L_j^{a=m-1} < S]$$

to each of which is permanently assigned a binary value 0 or 1 different from that of the two fields situated on either side.

The signal S originating from the multiplexing means 5 is compared, in comparison means 11, with the value of each of the 2m switching thresholds $L_j$ and $-L_j$ taken in increasing order of value, which deliver a number of signals $B_j$ equal to 2m, i.e. the signals ranging from $B_1$ resulting from the comparison of the signal S with the threshold $-L_j^{a=m-1}$ to $B_{2m}$ resulting from the comparison of the signal S with the threshold $L_j^{a=m-1}$, which respectively adopt the value 0 when the instantaneous value of the signal S is respectively lower than the value of the threshold under consideration and a value equal to 1 when this instantaneous value is higher than this same threshold value.

The 2m signals $B_j$ delivered by the comparison means 11 are sent to logic operator 12 carrying out the following Boolean operation:

(NOT $B_1$) OR ($B_2$ AND NOT $B_3$) ... OR ($B_{2m-2}$ AND NOT $B_{2m-1}$) OR $B_{2m}$ which produces a high-resolution signal $V_2$ of period identical to the signal $V_1$, phase-shifted with respect thereto by an angular value of $\pi/2m^*2n$.

Figure 9:
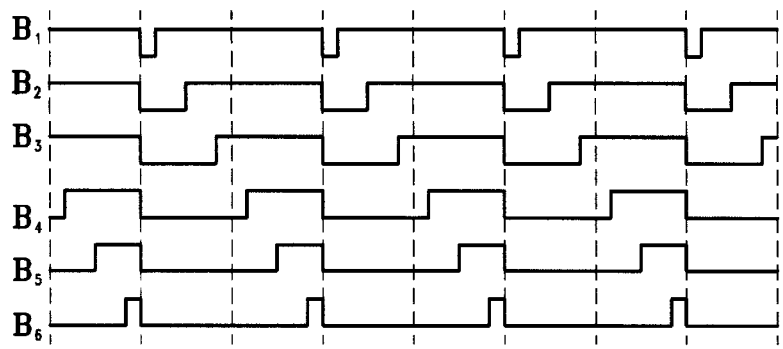
Figure 10:

In the particular case of n being equal to 2 and m being equal to 3, the comparison means delivers six signals $B_1$, $B_2$, $B_3$, $B_4$, $B_5$ and $B_6$ represented in FIG. 9 which adopt the value 0 when the instantaneous value of the signal S is lower respectively than the value of the thresholds $-L_j^{a=2}$, $-L_j^{a=1}$, $-L_j^{a=0}$, $L_j^{a=0}$, $L_j^{a=1}$, $L_j^{a=2}$, and a value equal to 1 when this instantaneous value is higher respectively than these same threshold values. The 2m signals $B_j$ delivered by the comparison means 11 are then combined in the logic operator 12 carrying out the following Boolean operation:

(NOT $B_1$) OR ($B_2$ AND NOT $B_3$) OR ($B_4$ AND NOT $B_5$) OR $B_6$ to give the signal V2 represented in FIG. 10, phase-shifted from the signal V1 by an angular value of $\pi/2m^*2n$, i.e. n/24.

It is possible, in some cases and owing to the switching rate in the multiplexing means, to observe that those parts of the signal S which correspond to the switching transients which link together the 2n segments of the signal S originating from the 2n sinusoidal signals Si produce, via the comparison means 11 and the logic operator 12, transient changes of state at the corresponding angles, creating spurious features in the middle of the square wave of the signal $V_2$. In the particular example of n=2, the spurious features occur, as shown by FIG. 10, at the angles $\theta 1 = \pi/4$, $\theta 3 = 3\pi/4$, $\theta 5 = 5\pi/4$ and $\theta 7 = 7\pi/4$.

Figure 11:
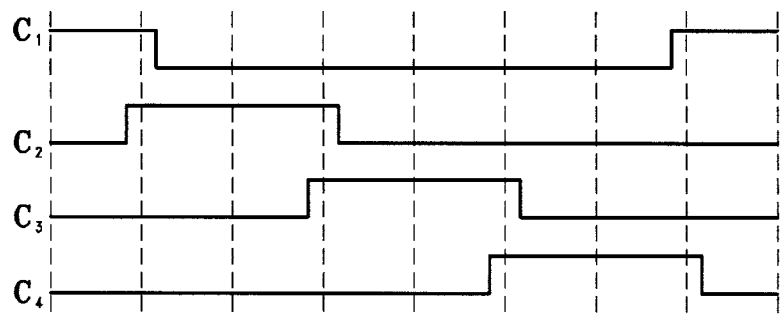

In order to eliminate the spurious features on the signal $V_2$, the 2n sinusoidal signals $S_i$ originating from the generating means 3 and phase-shifted by n/n are each compared, in means 13, with the threshold $L_j^{a=m-1}$ so as to deliver 2n rectangular signals $C_i$, with i being a whole number lying between 1 and 2n, corresponding respectively to the comparisons of the 2n signals S1, S2, ... S2n with the threshold $L_j^{a=m-1}$, which adopt a value 1 when the corresponding value of the signal $S_i$ is higher than the threshold value $L_j^{a=m-1}$ and the value 0 when the corresponding value of the signal $S_i$ is lower than this same threshold. FIG. 11 is the graphic representation of these 2n signals for the case of n=2, consisting of four signals $C_1$ to $C_4$.

Figure 12:
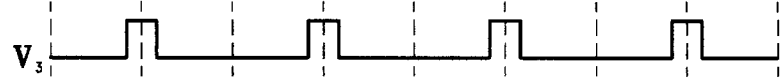

Logic operator 14 then performs on these signals originating from the comparison means 13 a Boolean operation according to the following formula:

($C_1$ AND $C_2$) OR ... ($C_i$ AND $C_{i+}$) OR ($C_{i+1}$ AND $C_{i+2}$) ... OR ($C_{2n-1}$ AND $C_{2n}$) OR ($C_{2n}$ AND $C_1$)

so as to deliver a signal $V_3$ consisting of a series of 2n square waves having the same binary state and the same angular value as the square waves of the signal $V_2$ and centered exactly on the square waves of the signal $V_2$ which are disturbed by the spurious features, at the angles $\theta_1$, $\theta_3$, $\theta_5$ and $\theta_7$. FIG. 12 shows the signal $V_3$ obtained as output from the Boolean operator 14, in the particular case of n equals 2 with the logic operation:

($C_1$ AND $C_2$) OR ($C_2$ AND $C_3$) OR ($C_3$ AND $C_4$) OR ($C_4$ AND $C_1$)

These two logic signals $V_2$ and $V_3$ are combined in a third (OR) logic operator 15 to give the output signal $V_4$ on a second line of the resolution multiplication device. This high-resolution output signal $V_4$, like the signal $V_1$, is composed of $2m^*n$ periods of a square wave signal in the interval of one period $(0,2\pi)$ of the signal originating from one of the analog sensors 1 or 2 and is phase-shifted by $\pi/(2m^*2n)$ with respect to the signal $V_1$.

Figure 13:
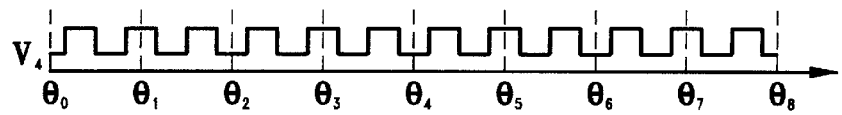

FIG. 13 illustrates the signal $V_4$ in the particular case of n being equal to 2 and m being equal to 3, phase-shifted by a value of $\pi/24$ with respect to the signal $V_1$ represented in FIG. 1. The combination of the signals $V_1$ and $V_4$ by an (EXCLUSIVE OR) logic operator, not represented in FIG. 1, may, according to the prior art, give a single output signal with twice the resolution of either of the signals $V_1$ or $V_4$. In some cases, it may be advantageous to select a value for the number n of signals generated which is high enough for the value of the maximum envelope E to be taken to be constant and equal to the amplitude A of the two sinusoidal signals originating from the two analog sensors with ϵ0 for the maximum difference between the envelope E and the constant amplitude A defined, as a percentage with respect to A, by:

$$\epsilon=[1-\cos\pi/2n]*100.$$

For example, for n=8, ϵ%=1.9%. If the difference ϵ is small enough and comparable with the accuracy demanded for the output signals, then the values of the switching thresholds $L_i$ and $L_j$ may be expressed by:

$$L_i \pm \pm 2a/2m * E * \sin(\pi/2n)$$

$$L_j \pm (2a+1)/2m * E * \sin(\pi/2n)$$

a and m having the same definitions as before.

In order to work at high voltage levels, it is possible to amplify the output signals from the analog sensors and the levels of the switching thresholds at the same amplification ratio. It may be advantageous to create a number of sinusoidal signals higher than 2n so as to establish a maximum envelope E with good precision and, by contrast, to use just 2n signals to establish the signal S as output from the multiplexing means.

Having described the invention, what is claimed is:

1. A device for multiplying the resolution and for determining the direction of displacement of a speed and displacement sensor system, consisting of a multipole magnetic encoder which can move past at least two fixed analog sensors, delivering sinusoidal signals of equal maximum amplitudes, these being centered on one and the same reference value and phase-shifted by $\pi/2$ radians, electrically speaking, the device comprising:

generator means for generating 2n sinusoidal signals ($S_i$) of the same amplitude (A), of the same center value as the signals delivered by the analog sensors, phase-shifted by $\pi/n$ with respect to each other, n being a positive whole number greater than or equal to 2;

multiplexing means for analog multiplexing of the 2n signals ($S_i$) delivering a signal (S) consisting of the succession of 2n portions of signals ($S_i$) phase-shifted by $\pi/n$, the amplitude of which lies between two values: $A*\sin(-\pi n/2n)$ and $A*\sin(\pi/2n)$;

acquisition means for acquisition of a maximum envelope (E) of the 2n signals ($S_i$);

first and second threshold means for generating (2m−1) switching thresholds ($L_i$) and (−$L_i$) and 2m switching thresholds ($L_j$) and (−$L_j$), respectively, which are proportional to the envelope (E), m being a positive whole number chosen as a function of the desired final resolution;

first and second comparator means for comparing the signal (S) respectively with each of the thresholds ($L_i$), (−$L_i$) and ($L_j$), (−$L_j$) originating from the first and second generator means delivering binary signals ($A_i$) and ($B_j$); and first and second combining means for combining the binary signals ($A_i$) and ($B_j$) delivering a signal ($V_1$) and ($V_2$), respectively, these signals being phase-shifted angularly by $\pi/4m*n$, each consisting of $2m*n$ periods of angle $\pi/m*n$ in the interval of one period (0,2π) of one or other of the signals originating from the analog sensors.

2. A device according to claim 1, wherein the first threshold means for generating switching thresholds generates a series of (2m−1) first switching thresholds, which series consists of the thresholds ($L_i$) defined by the formula: $L_i=E*\tan[\pi/2n \times 2a/2m]$ and of the thresholds (−$L_i$) symmetric with the thresholds ($L_i$) with respect to the reference value, m being a positive whole number chosen as a function of the desired final resolution and a being a positive whole number adopting all the values from 0 to (m−1) inclusive.

3. A device according to claim 2, wherein the threshold means for generating thresholds includes voltage dividers.

4. A device according to claims 1 and 2, wherein the first comparator means for comparing the signal (S) with each of the (2m−1) thresholds (−$L_i$) and ($L_i$) originating from the first generator means, delivers (2m−1) binary signals ($A_i$), from ($A_1$) to ($A_{2m-1}$) corresponding respectively to a comparison of the signal (S) with each of the thresholds (−$L_i$) and ($L_i$) taken in increasing order from the lowest level threshold (−$L_i$) to the highest level threshold ($L_i$) and which respectively adopt the value 0 when the instantaneous value of the signal (S) is below the comparison threshold under consideration, and the value 1 when this instantaneous value is respectively above this same threshold value.

5. A device according to claim 1, wherein the first combining means for combining the binary signals ($A_i$) delivered by the first comparator means consists of a logic operator carrying out the Boolean operation:

$$(A_1 \text{ AND NOT } A_2) \text{ OR } \ldots \text{ OR } (A_{2m-3} \text{ AND NOT } A_{2m-2}).\text{OR } A_{2m-1}$$

and which delivers a high-resolution output signal ($V_1$) on a first output line of the resolution multiplication device, this signal being composed of a series of $2m*n$ periods of a square wave signal with a period $\pi/(m*n)$ long.

6. A device according to claim 1, wherein the second threshold means for generating switching thresholds generates a series of 2m second switching thresholds, which series consists of the thresholds ($L_j$) defined by the formula:

$$L_j=E*\tan[\pi/2n \times (2a+1)/2m]$$

and of the thresholds (−$L_j$) symmetric with the thresholds ($L_j$) with respect to the reference value, m being a positive whole number chosen as a function of the desired final resolution and a being a positive whole number adopting all the values from 0 to (m−1) inclusive.

7. A device according to claim 6, wherein the threshold means for generating thresholds includes voltage dividers.

8. A device according to claim 1, wherein the second comparator means for comparing the signal (S) with each of the 2m thresholds (−$L_j$) and ($L_j$) originating from the second generation means delivers 2m binary signals ($B_j$), from ($B_1$) to ($B_{2m}$) corresponding respectively to the comparison of the signal (S) with each of the thresholds (−$L_j$) and ($L_j$) taken in increasing order from the lowest level threshold (−$L_j$) to the highest level threshold ($L_j$) and which respectively adopt the value 0 when the instantaneous value of the signal (S) is below the comparison threshold under consideration, and the value 1 when this instantaneous value is respectively above this same threshold value.

9. A device according to claim 1, wherein the second combining means for combining the binary signals ($B_j$) delivered by the second comparator means consists of a logic operator carrying out the Boolean operation:

$$(\text{NOT } B_1) \text{ OR } (B_2 \text{ AND NOT } B_3) \text{ OR } \ldots \text{ OR } (B_{2m-2} \text{ AND NOT } B_{2m-1}) \text{ OR } B_{2m}$$

and which delivers a high-resolution output signal ($V_2$) on a second output line of the resolution multiplication device, this signal being composed of a series of $2m*n$ periods of a square wave signal with a period $\pi/m*n$ long.

10. A device according to claim 9, wherein, when the signal (S) is passing between two neighboring portions of the signals ($S_i$) and, by means of the comparison means (11) and of the combination means (12), produces spurious features at the angles corresponding to these transitions, in the middle of the square waves and spaced by $\pi/n$ of the output signal ($V_2$), then:

- the sinusoidal signals ($S_i$) originating from the generator means are each compared with the highest level threshold ($L_j$) for which a is equal to (m−1) in a third comparator means for delivering 2n rectangular signals ($C_1$) to ($C_{2n}$) corresponding respectively to a comparison of the signals ($S_i$) from ($S_1$) to ($S_{2n}$) with said threshold and which adopt the value 0 when the instantaneous value of the signal ($S_i$) is below the comparison threshold and the value 1 when this instantaneous value is respectively higher than this threshold value;
- a logic operator performs on these signals ($C_i$) originating from the third comparator means the Boolean operation:

($C_1$ AND $C_2$) ... OR ($C_i$ AND $C_{i+1}$) OR ($C_{i+1}$ AND $C_{i+2}$) ... OR ($C_{2n}$ AND $C_1$)

delivering a signal ($V_3$) consisting of a series of 2n square waves spaced $\pi/n$ apart and centered precisely on the square waves of the signal ($V_2$) exhibiting a spurious feature; and

- a third logic OR operator (15) combining these two logic signals ($V_2$) and ($V_3$) using the logic operation: ($V_2$) OR ($V_3$), gives an output signal ($V_4$) on a second line of the device having $2m*n$ periods of a square wave signal with a period $\pi/m*n$ long.

11. A device according to claim 1, wherein the generator means generates, in addition to the 2n signals ($S_i$), sinusoidal signals with the same amplitude A centered on the same origin as the signals ($S_i$), these additional signals and the 2n signals ($S_i$) being uniformly phase-shifted and in that the acquisition means acquires, for the envelope (E), the maximum envelope of all of these additional signals and of the 2n signals ($S_i$).

12. A device according to claim 11, wherein the first threshold means for generating thresholds generates a first series of thresholds ($L_j$) and ($-L_j$) defined by the formula:

$$L_j = 2a/2m*E \sin \pi/2n$$

when the value of the envelope (E) acquired by the acquisition means for acquisition of a high number of sinusoidal signals can be taken as being constant and equal to A when compared with the required output precision, m being a positive whole number chosen as a function of the desired final resolution and a being a positive whole number adopting all values from 0 to (m−1).

13. A device according to claim 1, wherein the first threshold means for generating thresholds generates a second series of thresholds ($L_j$) and ($-L_j$) defined by the formula:

$$L_j = (2a+1)/2m*E \sin \pi/2n$$

when the value of the envelope (E) acquired by the acquisition means for acquisition of a high number of sinusoidal signals can be taken as being constant and equal to A when compared with the required output precision, m being a positive whole number chosen as a function of the desired final resolution and a being a positive whole number adopting all values from 0 to (m−1).

14. A device according to claim 1, wherein the sign of displacement of the magnetic encoder is fixed permanently by identifying a succession of sinusoidal signals ($S_i$) which appear for a direction of displacement from 0 to $2\pi$ radians chosen conventionally with respect to geometric situations of the two analog sensors.

* * * * *